United States Patent
Kao et al.

(10) Patent No.: US 7,136,972 B2
(45) Date of Patent: Nov. 14, 2006

(54) APPARATUS, SYSTEM, AND METHOD FOR DISTRIBUTED MANAGEMENT IN A STORAGE SYSTEM

(76) Inventors: Kelvin Kao, 4088 Louvre Ave., San Jose, CA (US) 95135; Teddy Gordon Greer, 32414 Lake Mask Pl., Fremont, CA (US) 94555

( * ) Notice: Subject to any disclaimer, the term of this patent is extended or adjusted under 35 U.S.C. 154(b) by 307 days.

(21) Appl. No.: 10/884,295

(22) Filed: Jul. 2, 2004

(65) Prior Publication Data

US 2006/0031605 A1 Feb. 9, 2006

Related U.S. Application Data (60) Provisional application No. 60/533,110, filed on Dec. 30, 2003.

(51) Int. Cl.
*G06F 12/00* (2006.01)
(52) U.S. Cl. .................................. 711/154; 711/118
(58) Field of Classification Search ............... 711/118, 711/154; 710/39
See application file for complete search history.

(56) References Cited

U.S. PATENT DOCUMENTS

2001/0047381 A1* 11/2001 Meno et al. ............... 709/101

* cited by examiner

*Primary Examiner*—Hiep T. Nguyen (57) ABSTRACT

An apparatus, system, and method are disclosed for distributed management in a storage system. The invention distributes increasingly complex storage management tasks to a message management module, a drive management module, a cache management module, and an interface management module to control operations of one or more storage devices, without depending on the availability of a "super" microprocessor. Furthermore, the invention provides for efficient inter-module communication through point-to-point passing of asynchronous queued messages and use of a centralized input/output context memory, such that all said modules may work in parallel independently and cooperatively, optimizing storage input/output performance at a reduced cost.

26 Claims, 9 Drawing Sheets

(Prior Art)

APPARATUS, SYSTEM, AND METHOD FOR DISTRIBUTED MANAGEMENT IN A STORAGE SYSTEM

CROSS-REFERENCES TO RELATED APPLICATIONS

This application claims benefit of U.S. Provisional Patent Application No. 60/533,110 entitled "APPARATUS, SYSTEM, AND METHOD FOR DISTRIBUTED PROCESSING IN A STORAGE SYSTEM," filed on Dec. 30, 2003, for Kelvin Kao and Teddy Gordon Greer, which is incorporated herein by reference.

BACKGROUND OF THE INVENTION

1. Field of the Invention

This invention relates to data storage control architectures and more particularly relates to distributed management for data storage control architectures.

2. Description of the Related Art

Storage systems perform many management tasks for reading and writing data. Storage system management tasks may include accepting read and write data requests, controlling devices, mapping data to storage locations, mirroring data, adding redundant information, maintaining storage devices, and managing the flow of data to and from the storage devices. Storage systems may include Redundant Arrays of Independent Disks (RAID) systems and hard disk drives. Storage systems frequently use microprocessors to manage storage system tasks.

Figure 1:
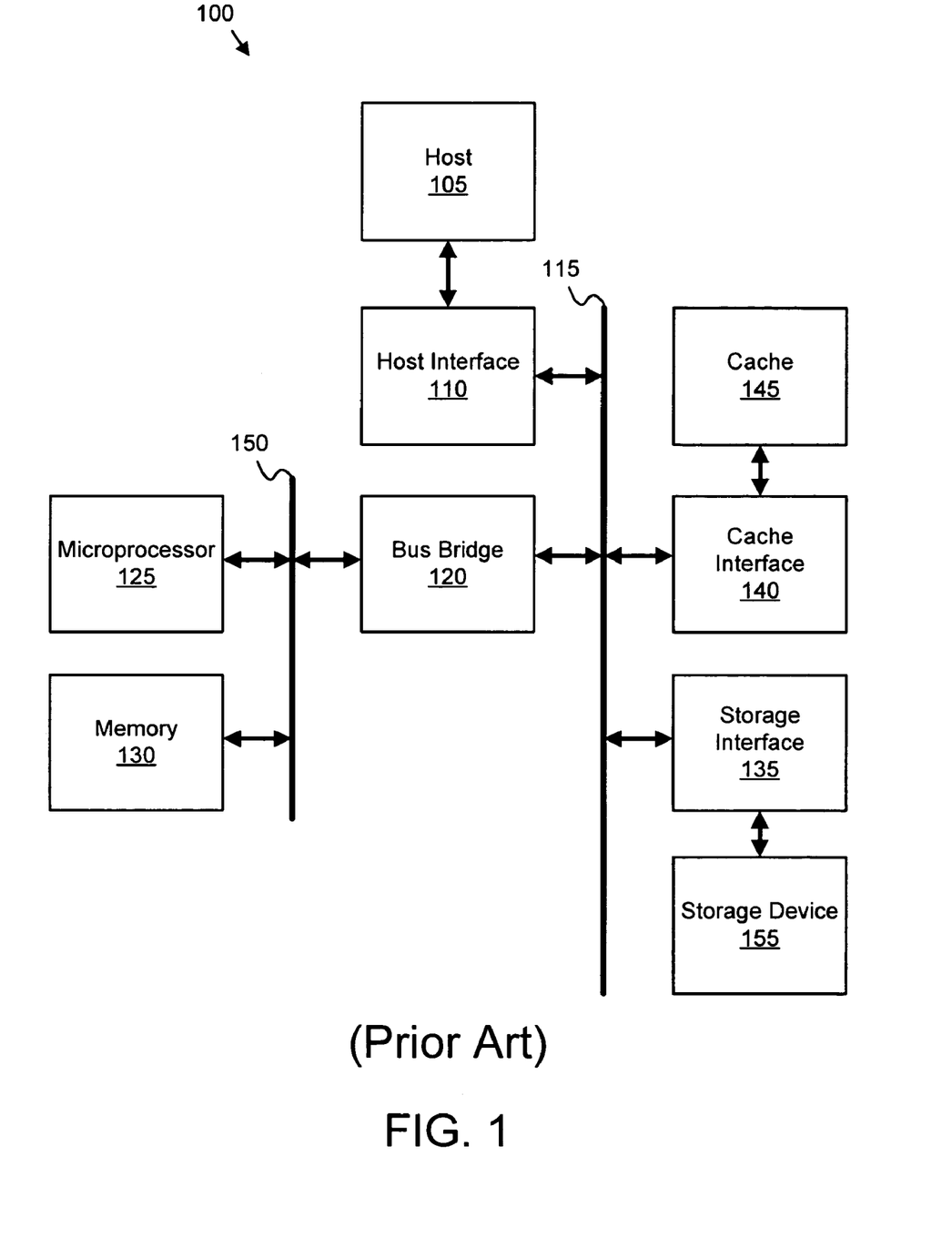
FIG. 1 is a block diagram illustrating a storage system of the current practice.

FIG. 1 is a block diagram illustrating a storage system 100 in accordance with the current practice. The storage system 100 manages data storage tasks with a microprocessor 125. The storage system 100 includes a host 105, a host interface 110, an interface bus 115, a bus bridge 120, a local bus 150, a microprocessor 125, a memory 130, a storage interface 135, a cache interface 140, a cache 145, and a storage device 155.

The host 105 transfers data and commands and receives data and status responses through the host interface 110. The microprocessor 125 receives the commands through the interface bus 115, the bus bridge 120, and the local bus 150. The microprocessor 125 may also receive data. In addition, the microprocessor 125 fetches instructions from the memory 130 through the local bus 150. The microprocessor 125 controls the storage system 100 by issuing commands through the local bus 150, the bus bridge 120, and the interface bus 115 to the storage interface 135 and the storage device 155. The storage interface 135 communicates with one or more storage devices 155. In addition, the microprocessor 125 manages operations of the cache 145 through the cache interface 140. The microprocessor 125 manages storage tasks to read and write data. Furthermore, the microprocessor 125 may be required to dynamically perform other specific RAID tasks such as a standby rebuild and hot drive swapping and update RAID configuration information accordingly.

Unfortunately, as data processing system demands for data access increase, the storage system management tasks increase. The microprocessor 125 may be unable to efficiently manage the storage system tasks. Furthermore, growing task complexity increases microcode path lengths. The microprocessor developments such as wider instruction fetch, higher instruction issuing rates, larger instruction windows and more branch predictions have not kept up with the storage task management demands of storage systems.

The interface bus 115 and local bus 150 may become bottlenecks to the rapid flow of data and commands between the host and the storage devices. In addition, the microprocessor 125 may have insufficient processing bandwidth to manage the storage tasks. Therefore, the desired increases in performance and cost reduction are difficult to achieve.

What is needed is a process, apparatus, and system that distributes management tasks among two or more task specific modules of lesser complexity. What is further needed is a process, apparatus, and system that allows centralized intermodule communication to promote parallelism among those modules. Beneficially, such a process, apparatus, and system would increase the task management bandwidth of storage systems at reduced cost.

SUMMARY OF THE INVENTION

The present invention has been developed in response to the present state of the art, and in particular, in response to the problems and needs in the art that have not yet been fully solved by currently available storage microcontrollers utilizing centralized interrupt-driven microprocessors. Accordingly, the present invention has been developed to provide an apparatus, system, and method for distributed storage management using micro-sequencers capable of conducting asynchronous peer-to-peer and point-to-point queued communication that overcome many or all of the above-discussed shortcomings in the art.

In one aspect, the apparatus for distributed storage management is provided with a logic unit containing a plurality of modules configured to functionally and cooperatively execute the necessary steps of storage management. These modules in the described embodiments include a messaging module, a drive module, a cache module, and an interface module. The messaging module communicates with a host interface and receives and communicates an asynchronous queued message ("AQM"). The AQM sent from one module to another is a data structure understood by both the sender module and the receiver module and stored in a memory-based message queue pre-assigned to the receiver module, which can execute independently when ready. The messaging module communicates with the host interface responsive to a host command and the AQM. The drive module communicates with the messaging module, the cache module, and the interface module. In addition, the drive module receives and communicates the AQM, converts a logical address to a physical address, and manages storage device tasks responsive to the AQM. The cache module receives and communicates the AQM and manages caching read and write data responsive to the AQM. The interface module also receives and communicates the AQM and transfers data through a storage interface to and from the storage device responsive to the AQM.

The apparatus is further configured, in one embodiment, to include an exception processor. The exception processor receives and communicates the AQM and manages a specific task responsive to the AQM. In a certain embodiment, the apparatus may be configured to include a data module. The data module communicates with the drive module and receives and communicates the AQM and manages storage management background tasks responsive to the AQM. In an alternate embodiment, the drive module may be a RAID manager.

In a further embodiment, the apparatus is configured to include an input/output context ("IOCTX") memory module. The IOCTX memory module stores command and operational parameters for passing among distributed storage management modules and manages IOCTX memory space allocation. In a certain embodiment, the apparatus is further configured to include an AQM queuing module. The AQM queuing module holds queues of a plurality of AQMs as linked lists for inter-module communication and parameter passing from the IOCTX memory. In one embodiment, the data structure of the AQM includes an IOCTX memory pointer, an AQM type, and an AQM originator identity.

In another aspect of the present invention, a system for distributed storage management tasks is also presented. The system may be embodied in a data storage system such as a RAID system. In particular, the system, in one embodiment, includes a storage device, a host, a cache memory, and a plurality of distributed storage management modules in communication with the storage device, the cache memory, and the host. In a certain embodiment, the distributed storage management modules receive and communicate a plurality of AQMs. The distributed storage management modules also convert logical addresses to physical addresses, manage the storage device, manage caching read and write data, and create each AQM responsive to a host command and other AQMs.

The system may further include an IOCTX memory module. The IOCTX memory module holds command and operational parameters to be passed among the distributed storage management modules responsive to the AQM and manages IOCTX memory space allocation. In a certain embodiment, the system further includes an AQM queuing module. The AQM queuing module maintains queues of a plurality of AQMs as linked lists. Each AQM in the AQM queuing module may contain a pointer to the IOCTX memory, an AQM type, and an AQM originator identity. In a further embodiment, the system includes an exception processor. The exception processor manages a specific task responsive to the AQM. The system may further include a data module. The data module manages storage management background operations. The storage device may be a Serial Attached SCSI ("SAS") disk drive, a Serial Advanced Technology Attachment ("SATA") disk drive, or a Fibre Channel disk drive.

A method of the present invention is also presented for distributed storage management. The method in the disclosed embodiments substantially includes the steps necessary to carry out the functions presented above with respect to the operation of the described apparatus and system.

The method receives a host command. The host command may originate in a host device. The method communicates an AQM for address translation in response to the host command. The method may translate a logical address to a physical address responsive to the AQM. In addition, the method communicates an AQM for caching management. The method further communicates the AQM for data transfer. In one embodiment, the method initiates data transfer in response to the data ready AQM. The method further communicates the AQM for completion presentation. The method also may include communicating an AQM to transfer data from a storage interface to the host interface in response to a read command. The method may further include communicating an AQM to transfer data from the host interface to the storage interface in response to a write command.

The present invention distributes storage management tasks to a plurality of distributed storage management modules and provides for efficient inter-module communication through point-to-point passing of AQMs and the use of a common IOCTX memory, to increase storage system performance at a reduced cost. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, microsequencers or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
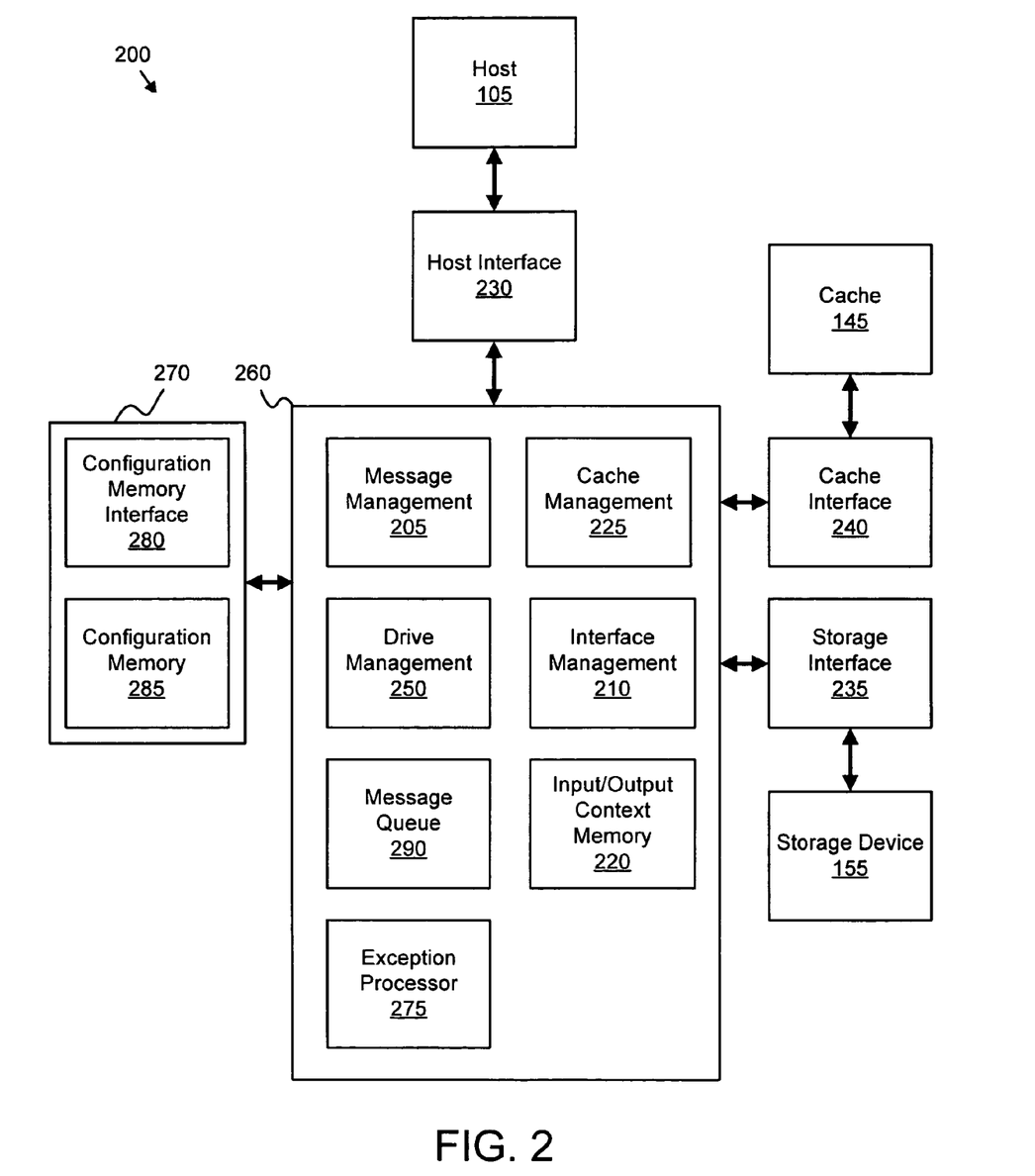
FIG. 2 is a block diagram illustrating one embodiment of a distributed management storage system in accordance with the present invention.

FIG. 2 is a block diagram illustrating one embodiment of a distributed management storage system 200 in accordance with the present invention. The distributed management storage system 200 distributes storage management tasks. The distributed management storage system 200 includes a host 105, a host interface 230, a storage interface 235, a storage device 155, a cache interface 240, a cache 145, a message management module 205, a cache management module 225, a drive management module 250, an interface management module 210, a message queue module 290, an input/output context ("IOCTX") memory module 220, and an exception processor 275. In one embodiment, the distributed management storage system 200 includes a configuration information module group 270. The configuration information module group 270 includes a configuration memory interface 280 and a configuration memory 285. Although for purposes of clarity, the distributed management storage system 200 is depicted with one host interface 230, one cache interface 240, one cache 145, one storage interface 235, one storage device 155, and one exception processor 275, any number of host interfaces 230, cache interfaces 240, caches 145, storage interfaces 235, storage devices 155, and exception processors 275 may be employed.

In one embodiment, the message management module 205, the drive management module 250, the cache management module 225, the interface management module 210, and the exception processor 275 ("Subprocessors") are integrated in an integrated device 260. The Subprocessors may each perform one or more specified management tasks. In a certain embodiment, the message management module 205, the drive management module 250, the cache management module 225, and the interface management module 210 are task-specific microsequencers utilizing writable control stores, streamlining the host command flow from the host interface 230 to the storage interface 235. In terms of processing power, a microsequencer generally lies between an overpowering microcontroller, typically a computer control system on an integrated circuit chip, and a finite state machine ("FSM"), which is ineffective for complex sequences or communication protocols. In one embodiment, with a modest amount of circuitry required for implementation, the microsequencer is compact enough to be used like one of FSM-based design blocks, yet the microsequencer provides microcontroller-like procedural control.

In one embodiment, Subprocessors are mutually in communication. In a certain embodiment, the Subprocessors communicate by exchanging one or more asynchronous queued messages (AQMs). In one embodiment, each AQM may include one or more commands. Each command may direct the execution of a specified process. In a certain embodiment, the AQM may involve operational data. In addition, the Subprocessors are in communication with the IOCTX memory 220 for command and operational parameter passing.

In one embodiment, the IOCTX memory module 220 may have a memory organized in contiguous blocks of a specified size, and an associated linked list identifying free (unoccupied) memory blocks available for space allocation, as illustrated in FIGS. 5 and 6a–c. The IOCTX memory 220 provides storage of host command and operational parameters stored and retrieved by the Subprocessors. The IOCTX memory 220 manages allocation of IOCTX memory space for the Subprocessors requiring storage therein. In one embodiment, a block of IOCTX memory 220 is allocated for the message management module 205 for storage of command parameters originated from or sent to the host 105, the block of IOCTX memory 220 referred to as host-oriented input/output context ("H-IOCTX"), during the host command execution. In one embodiment, the block of IOCTX memory 220 used for an H-IOCTX is allocated at the commencement of the host command execution for the message management module 205. The block of IOCTX memory 220 for the H-IOCTX may further be freed by the message management module 205 subsequent to the host command execution.

In a certain embodiment, a block of IOCTX memory 220 is allocated for internal storage device-oriented data transfer parameters, referred to as disk-oriented input/output context ("D-IOCTX"), during the data transfer. In one embodiment, the block of IOCTX memory 220 used for a D-IOCTX is allocated at the commencement of a data protection operation such as adding redundancy to write data for the cache management module 225. The block of IOCTX memory 220 for the D-IOCTX may further be freed by the cache management module 225 subsequent to the data protection operation. In a certain embodiment, the IOCTX memory 220 may contain additional types of context, allocations of which may be statically made.

Figure 7:
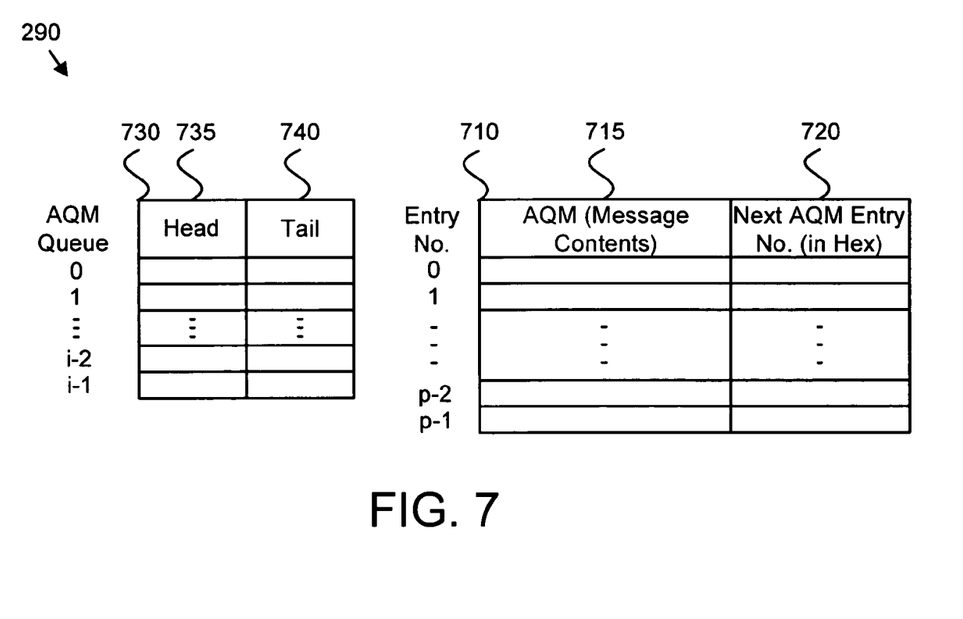
FIG. 7 is a block diagram illustrating one embodiment of a message queue module in accordance with the present invention.
Figure 8A:
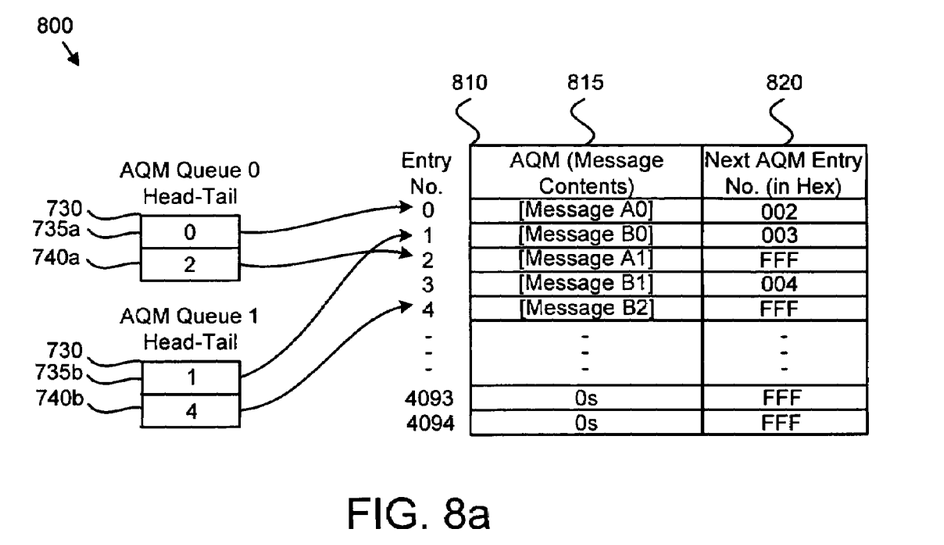
FIG. 8a is a block diagram illustrating exemplary insertion of messages in one embodiment of a message queue in accordance with the present invention.
Figure 8B:
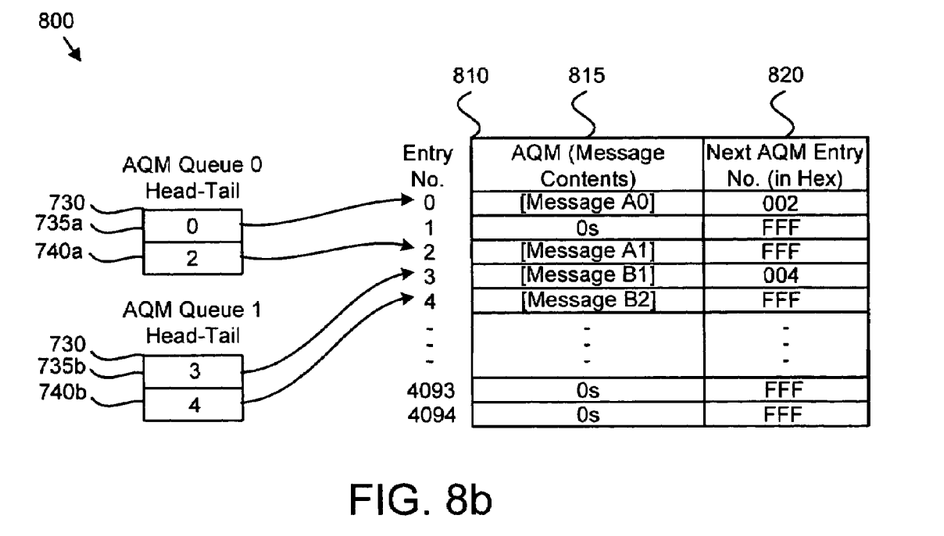
FIG. 8b is a block diagram illustrating exemplary removal of a message from one embodiment of a message queue in accordance with the present invention.

In one embodiment, the message queue module 290 is configured to allow passing of parameters stored in the IOCTX memory 220 among the Subprocessors via the AQM. The message queue module 290 includes a plurality of pre-assigned message queues, wherein AQMs are entered by sender Subprocessors and wherefrom AQMs are independently removed by receiver Subprocessors when ready in a first in, first out ("FIFO") order as shown in FIG. 8b, and a message buffer pooling a pre-specified maximum number of AQMs of all the message queues, as illustrated in FIGS. 7, 8a, and 8b. An AQM sender Subprocessor can send messages to a message queue pre-assigned to an AQM receiver Subprocessor and continue operating without waiting for a response from the latter. Message queuing in this manner adapts to asynchronous inter-processor communication needs for distributed storage management tasks. In one embodiment, the available entries in the message buffer may limit the depth of each message queue. In a certain embodiment, the message queue module 290 maintains each message queue as a singly linked list of AQMs, as illustrated in FIGS. 8a and 8b. In a further embodiment, some message queues may be prioritized, requiring retrieval of AQMs in order of priority.

In a certain embodiment, the data structure of the AQM entered into the message queue may include a pointer to a block of the IOCTX memory 220, an AQM type, and an AQM originating Subprocessor identity. The pointer to the block of the IOCTX memory 220 is used for the AQM receiver Subprocessor to access the block of the IOCTX memory 220 at the specified location. A null pointer to a non-existent block of the IOCTX memory 220 indicates that no IOCTX is associated with the AQM. The AQM type may indicate such process to be executed or interpreted as a buffer ready, data ready, a read, a write, a rebuild, an initialization, a watermark check, or a completion. The receiver Subprocessor receiving an AQM may determine the sender Subprocessor communicating the AQM.

The message management module 205 receives a command from the host 105 through the host interface 230. The message management module 205 may convert the host command into an AQM pointing to a command parameter block in the H-IOCTX memory 220. In addition, the message management module 205 may communicate one or more AQMs. In one embodiment, the AQM indicates a read process. In an alternate embodiment, the AQM indicates a write process.

The drive management module 250 receives one or more AQMs. In addition, based on the array configuration information held in the configuration memory 285, the drive management module 250 may convert the AQM-directed H-IOCTX including a storage device 155 address and a logical address to an AQM specifying a physical address. In a certain embodiment, the drive management module 250 communicates one or more AQMs.

The cache management module 225 communicates with the cache interface 240 and manages cache 145 management tasks through the cache interface 240. The cache 145 may provide temporary storage for data being read from or to be written to the storage device 155. The cache management module 225 further receives and communicates one or more AQMs. In one embodiment, the cache management module 225 locates the physical address in response to the AQM specifying the physical address. The physical address may be mapped to the cache 145. The physical address may also be mapped to the storage device 155 with an appropriate offset.

The interface management module 210 communicates with the storage interface 235. In one embodiment, the storage interface 235 is a serial attached small computer system interface ("SAS"). In an alternate embodiment, the storage interface 235 is a serial advanced technology attachment ("SATA") interface. In another alternate embodiment, the storage interface is a Fibre Channel interface. The interface management module 210 receives and communicates one or more AQMs. In addition, the interface management module 210 manages the storage interface 235 in response to the AQM.

The storage interface 235 communicates with the storage device 155 including communicating a storage command. In one embodiment, the storage interface 235 writes data to the storage device 155. In an alternate embodiment, the storage interface 235 reads data from the storage device 155. In addition, the storage interface may receive a status indicating normal completion, hereinafter referred to as completion, from the storage device 155. The completion confirms the normal completion of the storage command.

In one embodiment, the message management module 205 receives a read command from the host 105 through the host interface 230. The message management module 205 allocates a block of H-IOCTX memory 220 and communicates a read AQM to the drive management module 250. The drive management module 250 accesses the configuration memory 285 to determine the storage device 155 member in a storage group. In one embodiment, the drive management module 250 obtains the physical address of the first data block to be read from a logical-to-physical translation structure. The drive management module 250 communicates a read AQM to the cache management module 225. In one embodiment, the cache management module 225 creates a data structure in the cache 145 to receive data in response to the read AQM. The cache 145 data structure may receive data from the storage interface 235. The cache management module 225 communicates a buffer ready AQM. The interface management module 210 commands the storage device 155 to retrieve data responsive to the buffer ready AQM. The storage device 155 transfers the data through the storage interface 235 to the cache 145 data structure. In an alternative embodiment, the number of blocks of data to be read may span an adjacent member storage device 155, and as such the read AQM is concurrently repeated for the additional storage device 155 as appropriate.

In one embodiment, the storage device 155 communicates a completion to the interface management module 210 through the storage interface 235. The interface management module 210 may communicate a completion AQM responsive to the completion. The cache management module 225 may transfer the data in the data structure in the cache 145 to the host interface 230 in response to the completion AQM. In a certain embodiment, the message management module 205 transfers the data from the data structure to host 105 through the host interface 230 in response to a data ready AQM from the cache management 225. The message management module 205 may also communicate a completion to the host interface 230 subsequent to transferring the data. In addition, the cache management module 225 may free the data structure buffer space in response to the completion AQM. The message management module 205 frees the block of H-IOCTX memory 220 at the conclusion of the host command execution.

In an alternate embodiment, the message management module 205 receives a write command from the host 105 through the host interface 230. The message management module 205 allocates a block of H-IOCTX memory and communicates a write AQM to the drive management module 250. The drive management module 250 accesses the configuration memory 285 to determine the address of the storage device 155. In one embodiment, the drive management module 250 obtains the physical address of the first data block to be written from a logical-to-physical translation structure. The drive management module 250 communicates a write AQM to the cache management module 225. The cache management module 225 creates a data structure in the cache to receive write data from the host 105 in response to the write AQM. The cache management module 225 communicates a buffer ready AQM to the drive management module 250. The drive management module 250 communicates a buffer ready AQM to the message management module 205. The message management module 205 may transfer data from the host 105 through the host interface 230 to the data structure of the cache 145.

The drive management module 250 may determine from the configuration memory 285 that the storage device 155 selected to write data has a write back cache policy pre-specified. As such, the cache management module 225 may communicate a completion AQM to the drive management module 250. The drive management module 250 communicates the completion AQM to the message management module 205. The message management module 205 communicates the completion to the host interface 230. Subsequently, the message management module 205 frees the block of H-IOCTX memory. The cache management module 225 marks the data structure in the cache 145 as "dirty." A dirty data structure is subsequently transferred to the storage device 155.

The drive management module 250 may determine that the storage device 155 specified in the write command is configured to append one or more parity bits for data redundancy in a parity RAID array. The data protection mechanism of the array is one of industry standard RAID levels such as RAID 5. In the event that a member read operation in the array fails, the parity may be used to regenerate unreadable user data by exclusive oring the parity and user data on all other array members grouped in a pre-specified arrangement. The cache management module 225 may initiate a parity update process for the storage device 155.

In a certain embodiment, the parity update process is a "read-modify-writeback" operation. The cache management module 225 reads the old data and the old parity to the cache 145 through the cache interface 240 from the storage device 155 and causes an exclusive-OR ("XOR") engine to perform an XOR operation on the old data, the old parity, and the new data to generate a new parity consistent with the new data to be written. The cache management module 225 may communicate a data ready AQM to the interface management module 210 fro transferring the new data. In one embodiment, the interface management module 210 determines that the storage device 155 is ready to receive data responsive to the data ready AQM through the storage interface 235. In a certain embodiment, the interface management module 210 communicates a storage write command to the storage interface 235 in response to the data ready AQM. The interface management 210 subsequently directs the cache 145 to transfer the data to the storage device 155 through the storage interface 235.

In one embodiment, the interface management 210 communicates a completion AQM to the cache management 225 upon receiving a completion from the storage device 155 through the storage interface 235. In a certain embodiment, a similar process applies to the writing of new parity to a corresponding storage device 155 as appropriate, and the interface management 210 communicates a completion AQM to the cache management 225 upon the receipt of a completion from the storage device 155 subsequent to the write new parity operation. Unless a write back cache policy is involved in the write command, the message management module 205 may subsequently communicate a completion to the host 105 in response to the completion AQM.

In an alternative embodiment, the data to be written may span an adjacent member storage device 155, and as such, the process described above for writing new data is concurrently repeated for writing data in additional corresponding storage device 155 before a completion is presented to the host 105. In one embodiment, the cache management module 225 marks the data structure in the cache 145 as "no longer in use" and frees the block of D-IOCTX memory 220 subsequent to the write new parity completion.

In one embodiment, the message management module 205 communicates specified commands as one or more AQMs to the exception processor 275. Specified commands may include all commands except the read command and the write command. The distributed management storage system 200 distributes management tasks to the message management module 205, the drive management module 250, the cache management module 225, and the interface management module 210 to increase the processing bandwidth.

Figure 3:
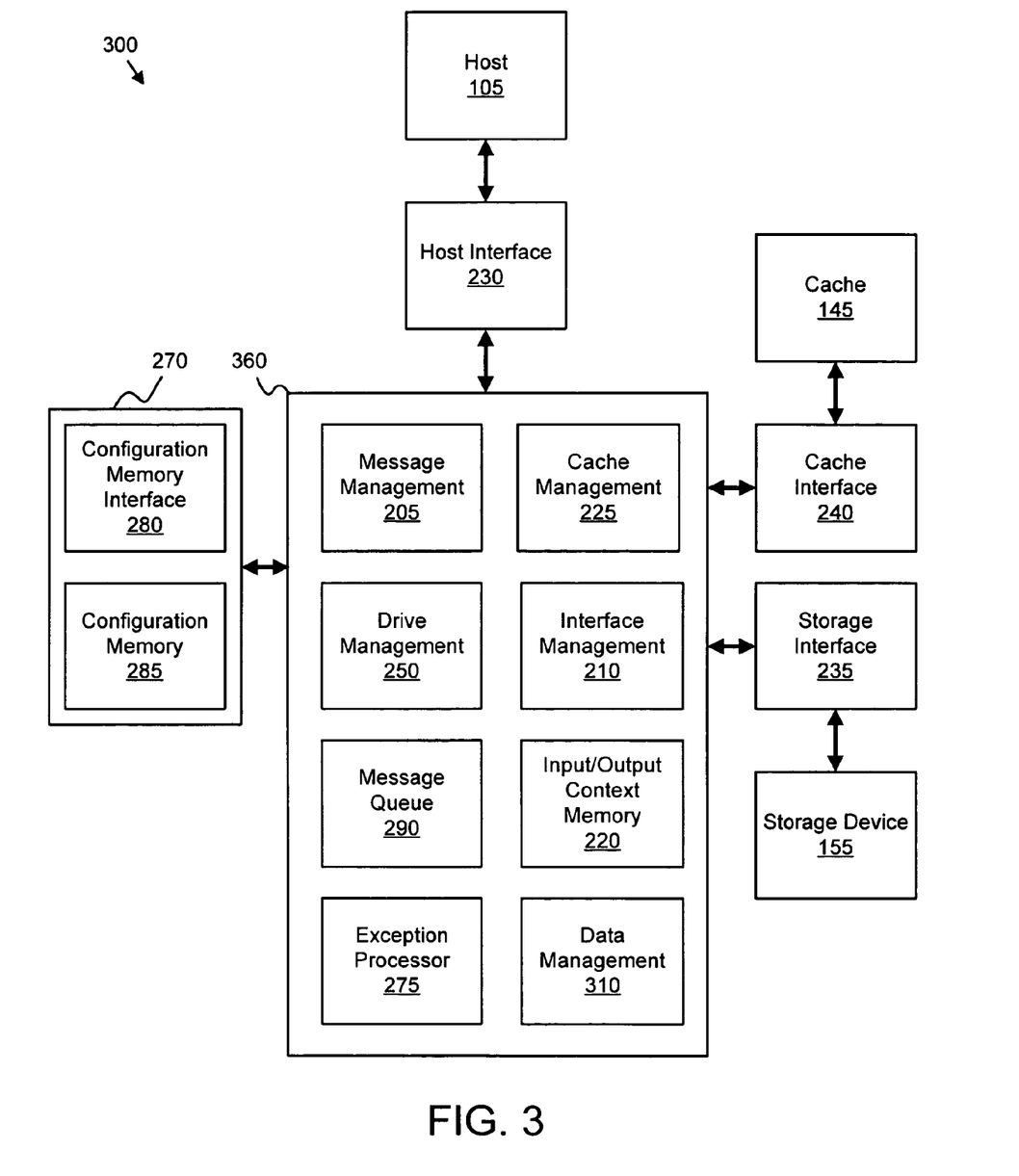
FIG. 3 is a block diagram illustrating one embodiment of an alternate distributed management system in accordance with the present invention.

FIG. 3 is a block diagram illustrating one embodiment of an alternate distributed management storage system 300 in accordance with the present invention. The distributed management storage system 300 includes the modules of the distributed management storage system 200. In addition, the distributed management storage system 300 includes a data management module 310. Although the distributed management storage system 300 is depicted with one host interface 230, one cache interface 240, one storage interface 235, and one storage device 155, any number of host interfaces 230, cache interfaces 240, storage interfaces 235, and storage devices 155 may be employed.

In one embodiment, the drive management 250 exchanges AQMs with the cache management 225 and the interface management 210 to coordinate management tasks with the storage device 155. In a certain embodiment, the drive management 250 also exchanges AQMs with the data management 310 as the data management module 310 maintains a data watermark for data structures in the storage device 155. The data watermark indicates the physical level of repair of the data structure.

In one embodiment, the data management 310 processes one or more storage management AQMs to manage background mode of operations. Storage management AQMs may include rebuilding the data structure in a background mode on the replacement storage device 155, replacing a failed storage device 155, and initializing the data structure on the storage device 155 in the background. In a certain embodiment, the data management 310 aids the drive management 250 in sorting the AQMs relative to the data watermark. For example, when the drive management 250 receives a read AQM, the drive management 250 exchanges AQMs with the data management 310 to determine whether to read the data normally or regenerate the data, depending on whether the data required is located above or below the rebuild data watermark, respectively. The distributed management storage system 300 distributes management tasks in an integrated device.

Figure 4:
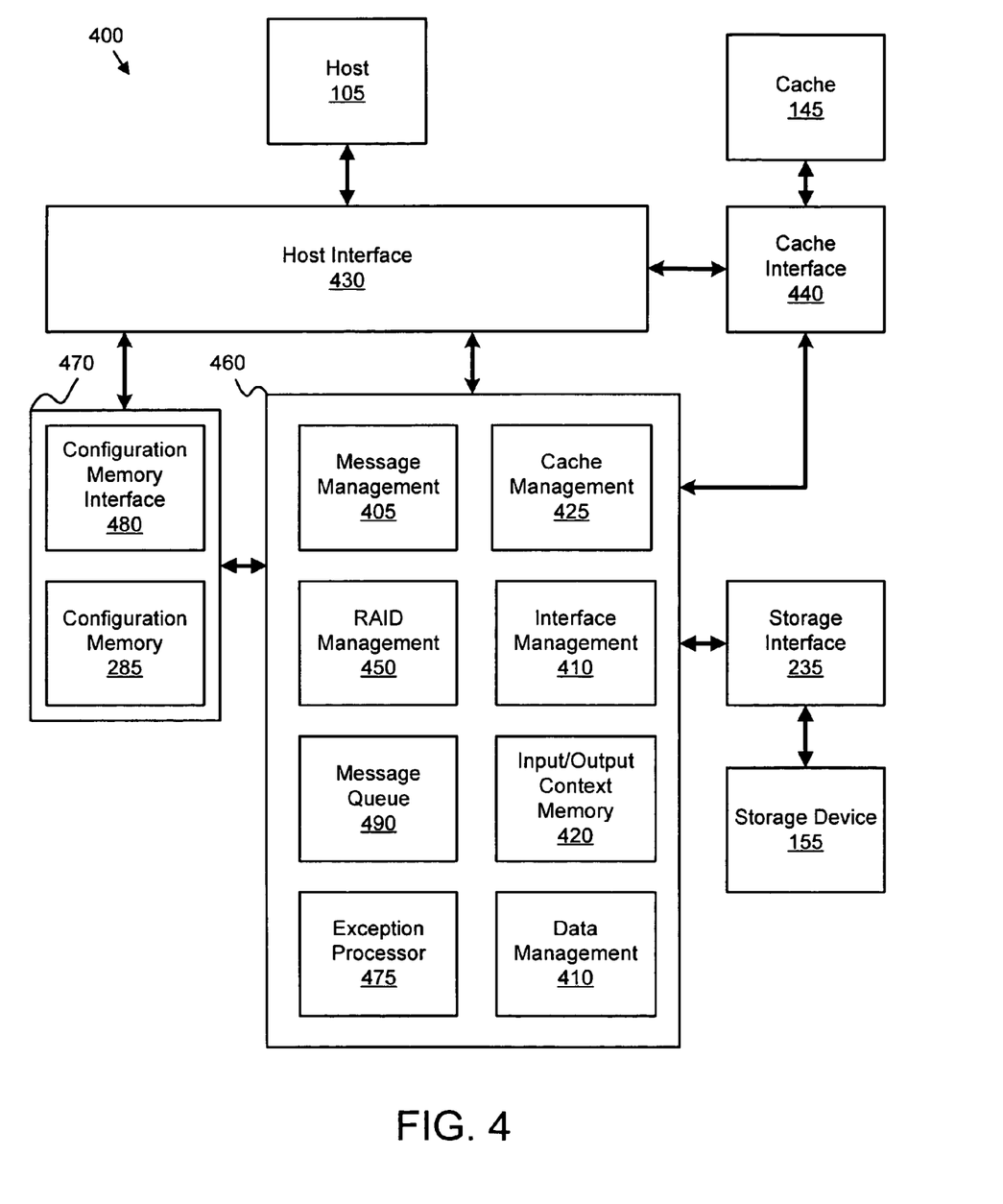
FIG. 4 is a block diagram illustrating one embodiment of an expanded distributed management storage system in accordance with the present invention.

FIG. 4 is a block diagram illustrating one embodiment of an expanded distributed management storage system 400 in accordance with the present invention. As depicted, intermodule connections of the distributed management storage system 300 are reconfigured in FIG. 4 to control a storage device 155. The distributed management storage system 400 includes a host 105, a host interface 430, a configuration information group 470, a cache interface 440, a cache 145, a storage interface 135, a storage device 155, and a module group 460. The configuration information group 470 includes a configuration memory interface 480 and a configuration memory 285. Similar in component functions to the module group 360, the module group 460 includes a message management module 305, a cache management module 425, a RAID management module 450, an interface management 410, a message queue module 490, an input/output context memory module 420, an exception processor 475, and a data management module 410.

The RAID management module 450 may be the drive management module 250. The storage device 155 is a RAID storage device 155. Although for purposes of clarity, the distributed management storage system 400 is depicted with one host interface 430, one cache interface 440, one cache 145, one storage interface 235, one storage device 155, and one exception processor 475, any number of host interfaces 430, cache interfaces 440, caches 145, storage interfaces 235, storage devices 155, and exception processors 475 may be employed.

In the depicted embodiment, the host interface 430 in communication with the cache interface module 440 conducts two-way communication with the host 105 for command fetch and host message exchange. The host interface 430 may further communicate with the configuration information group 470 during configuration of RAID devices. The module group 460 communicates with host interface 430, the configuration information group 470, the cache interface 440 and the storage interface 235. Although only one distributed management storage system 400 is shown, in a certain embodiment, any number of extended distributed management storage systems 400 may be provided, sharing the RAID storage devices 155. In a certain embodiment, two or more extended distributed management storage systems 400 are also interconnected with signaling paths between each pair of extended distributed management storage systems 400.

Figure 5:
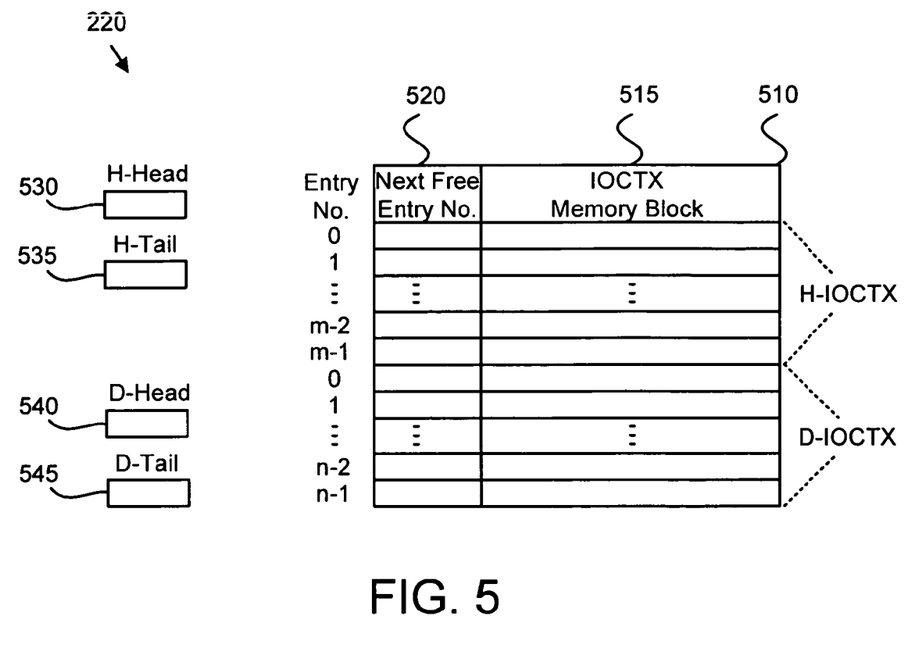
FIG. 5 is a block diagram illustrating one embodiment of an input/output context ("IOCTX") memory module in accordance with the present invention.

FIG. 5 is a block diagram illustrating one embodiment of an IOCTX memory module 220 in accordance with the present invention. The IOCTX memory module 220 includes an IOCTX table 510, an H-Head 530, an H-Tail 535, a D-Head 540, and a D-Tail 545. The IOCTX table 510 includes an IOCTX memory block column 515 and a next free entry number column 520. As depicted, the IOCTX memory block column 515 includes m entries of the host-oriented IOCTX ("H-IOCTX") memory section numbered 0, 1 through m-2 and m-1, and n entries of the disk-oriented IOCTX ("D-IOCTX") memory section numbered 0, 1, through n-2 and n-1. The next free entry number column 520 contains a linked list of entry numbers of free IOCTX memory blocks 515 available for allocation in the H-IOCTX memory section and a linked list of entry numbers of free IOCTX memory blocks 515 available for allocation in the D-IOCTX memory section. For each free entry of the IOCTX memory block column 515, a corresponding entry in the next free entry number column 520 contains a pointer pointing to the next free entry in the same memory section. The H-Head 530 contains a pointer pointing to the first free entry of H-IOCTX memory blocks 515 available for allocation.

The H-Tail 535 contains a pointer pointing to the last free entry of H-IOCTX memory blocks 535 available for allocation. Likewise, the D-Head 540 contains a pointer pointing to the first free entry of D-IOCTX memory blocks 515 available for allocation. The D-Tail 545 contains a pointer pointing to the last free entry of D-IOCTX memory blocks 515 available for allocation.

Figure 6A:
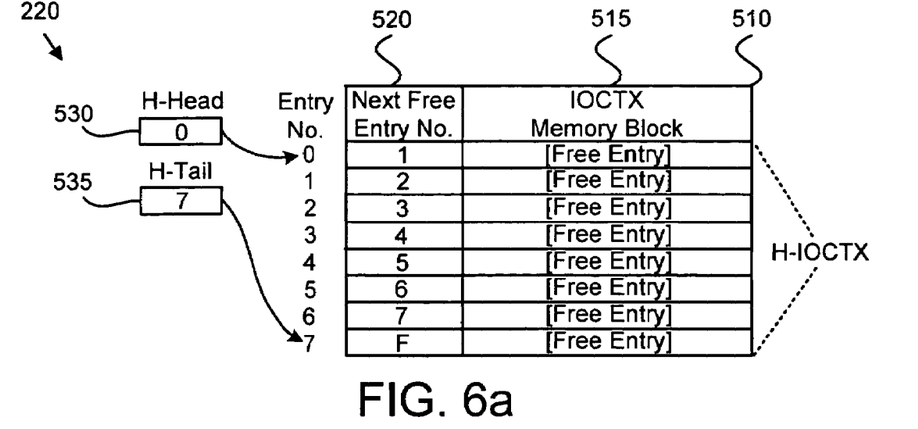
FIGS. 6a–c are block diagrams illustrating exemplary space allocation and de-allocation operations of one embodiment of an IOCTX memory in accordance with the present invention.
Figure 6B:
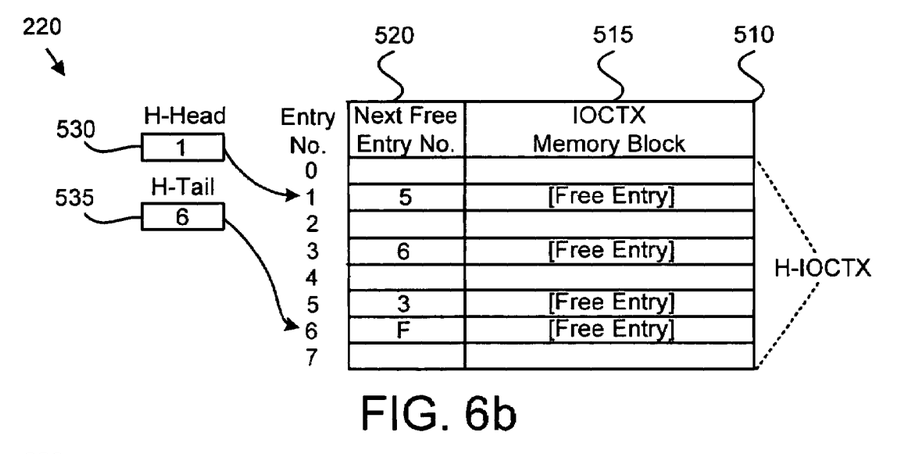
Figure 6C:
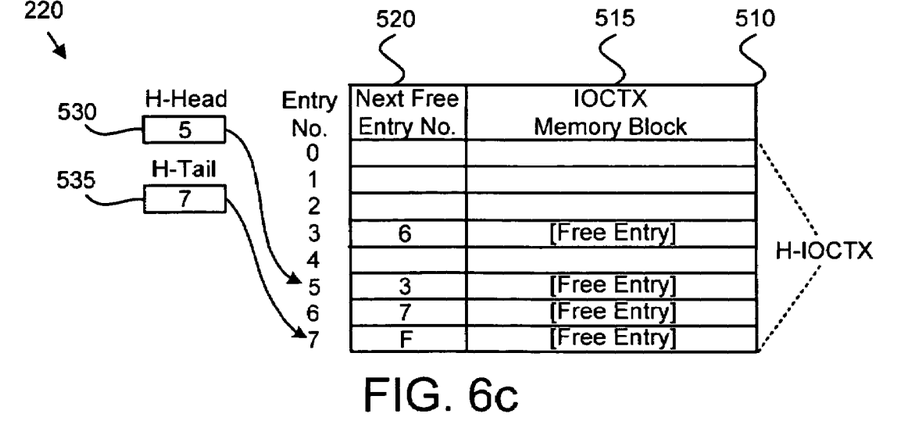

FIGS. 6a–c are block diagrams illustrating exemplary space allocation and de-allocation operations of one embodiment of an IOCTX memory module 220 in accordance with the present invention. In FIG. 6a, as an example, the H-IOCTX memory section of the IOCTX table 510 of one embodiment includes eight (8) entries. Each pointer pointing to the next free entry in the next free entry number column 520 is a hexadecimal digit representing an entry number of the IOCTX table 510, with the value F representing an invalid entry number. The IOCTX table 510 is initialized to have all entries free. As depicted, the first free entry in the IOCTX table 510 for allocation is entry number 0 as indicated by the H-Head 530. The next free entry is entry number 1 as indicated in the next free entry number column 520 for entry number 0. Following entry number 1 the next free entry is entry number 2, and so forth. The linked list of free entries of the IOCTX table 510 as shown in the next free entry number column 520 in this case consists of ordered entries numbered 0, 1,2 . . . 6,7. Entry number 7 is the last entry to be allocated, as indicated in the H-Tail 535. The pointer for entry number 7 in the next free entry number column 520 has the value F, an invalid entry number, identifying entry number 7 as the last entry in the linked list available for allocation.

At a certain point of time subsequent to the initialization of the IOCTX table 510 and after a number of space allocation and de-allocation operations as requested by Subprocessors (not shown), a linked list of free entries is illustrated in FIG. 6b. The H-Head 530 identifies entry number 1 as the first free entry in the IOCTX table 510 for allocation, and the H-Tail identifies entry number 6 as the last free entry for allocation. Coupled with pointers in the next free entry number column 520, the linked list of ordered free entries in the IOCTX table 510 consists of entries numbered 1, 5, 3, and 6, as shown.

Based on the linked list of free entries illustrated in FIG. 6b, entry number 1 is allocated in response to a request by a Subprocessor (not shown) for space allocation in the H-IOCTX memory section 515, as illustrated in FIG. 6c. Around the same time, entry number 7 is freed in response to a de-allocation request by a Subprocessor (not shown). Entry number 7 is subsequently appended to the end of the remaining linked list. Thus, the H-Head 530 indicates that entry number 5 is the first free entry, and the H-Tail 535 indicates that entry number 7 is the last free entry. The resultant linked list of free entries as shown consists of ordered entries numbered 5, 3, 6, and 7. Although FIGS. 6a, 6b and 6c illustrate the H-IOCTX memory section initialization, space allocation and de-allocation, the D-IOCTX counterpart functions in the exactly same manner.

FIG. 7 is a block diagram illustrating one embodiment of a message queue module 290 in accordance with the present invention. The message queue module 290 includes a message pool table 710 and an AQM queue head-tail table 730. The message pool table 710 includes an AQM column 715 and a next AQM entry number column 720. The AQM column 715 is the message buffer holding a maximum of p AQM entries wherein all asynchronous queued messages (AQMs) are dynamically stored and wherefrom all AQMs are dynamically retrieved and removed. Each entry in the message pool table 710 includes an AQM 715 and a next AQM entry number 720. As described previously, the contents of each inserted AQM 715 includes a pointer to an IOCTX memory block 515, an AQM type field, and an AQM originator identification (ID).

The message queue module 290 maintains each AQM queue as a singly linked list of chronologically entered AQMs via the next AQM entry numbers 720. Each entry in the next AQM entry number 720 is a pointer pointing to the next entry of the AQM 715 in the queue, which is entered in the next available entry in the message pool table 710 after the associated AQM 715 entry is made, as illustrated in FIGS. 8a and 8b. In one embodiment, the next AQM entry number 720 is a hexadecimal (hex) number.

The AQM queue head-tail table 730 includes a head column 735 and a tail column 740 for i AQM queues. Each entry in the AQM head-tail table 730 includes a head 735 and a tail 740 for a queue. The head 735 is a register containing a pointer pointing to the entry in the message pool table 710 where the first and the oldest AQM 715 in the queue is located. The tail 740 is a register containing a pointer pointing to the entry in the message pool table 710 where the last and the most recent AQM 715 in the queue is located. In one embodiment, the AQM column 715 is initialized with all 0s, indicating the availability of entries, and the next AQM entry number column 720 is initialized with all 1s, representing invalid entry numbers. The search for an available entry in the message pool table 710 by an AQM sender may be made from top down. Before any AQMs 715 are entered in a message queue, the two registers of the queue head 735 and the queue tail 740 have the same contents. While AQMs 715 are entered in the queue, the contents of the two registers remain the same for the first AQM 715, and the tail 740 will be changed as additional AQMs 715 are entered in the queue. In the latter case, as soon as a first new available entry in the message pool table 710 for entering an AQM 715 is determined, the next AQM entry number 720 and the tail 740 are updated with the new entry number, and a new AQM is entered into the new position of the message pool table 710. The AQM receiver may retrieve and remove the AQM 715 pointed to by the queue head 735 when ready, after which the queue head 735 is updated to point to the next AQM 715 entry as specified by the next AQM entry number 720 before the latter is loaded with all 1s.

FIG. 8a is a block diagram illustrating an exemplary insertion of messages in one embodiment of a message queue 800 in accordance with the present invention. The message queue module 800 includes a message pool table 810 and an AQM queue head-tail table 730. The message pool table 810 includes an AQM column 815 and a next AQM entry number column 820. Under an alternate embodiment, the message queue module 800 is configured and initialized in a manner similar to the message queue module 290, but has a message pool table 810 length of 4095, with entries numbered 0, 1, through 4094. The next AQM entry number 820 uses three consecutive hexadecimal (hex) digits to represent an entry number thereof. The hex number FFF is an invalid entry number. As depicted, AQM queue 0 has two AQMs 815: [MSG A0] and [MSG A1] entered in that order, and message queue 1 has three AQMs 815: [MSG B0], [MSG B1], and [MSG B2] entered in that order.

Viewing the message pool table 710 entries, [MSG A0] in entry 0 is linked to [MSG A1] in entry 2 by the next AQM entry number 720 in entry 0. The AQM queue 0 head 735a contains an entry number 0 and tail 740a contains an entry number 2, pointing to the first AQM 815 and the last AQM 815 of the AQM queue 0, respectively. Likewise, a linked list of AQMs 715 for AQM queue 1 is established. Apparently, [MSG B0] occurred after [MSG A0] but before [MSG A1], as shown by the message queue table 710. In this example, none of the entered AQMs 715 were retrieved while the five AQMs 815 were being entered. This example illustrates how AQMs 815 in a message queue are linked in the AQM pool table 810.

FIG. 8b is a block diagram illustrating an exemplary removal of a message in one embodiment of a message queue 800 in accordance with the present invention. Continuing from FIG. 8a, FIG. 8b shows that the AQM queue 1 receiver retrieves and removes the first AQM 815 ([MSG B0]) from entry number 1 in the message pool table 810, causing the AQM queue 1 head 735b to be loaded with an entry number 3 as specified by the next AQM entry number 820 in entry number 1, before the latter is updated with a hex number FFF. This example illustrates the removal of the AQMs 815 from a message queue in a first in, first out ("FIFO") order.

Figure 9:
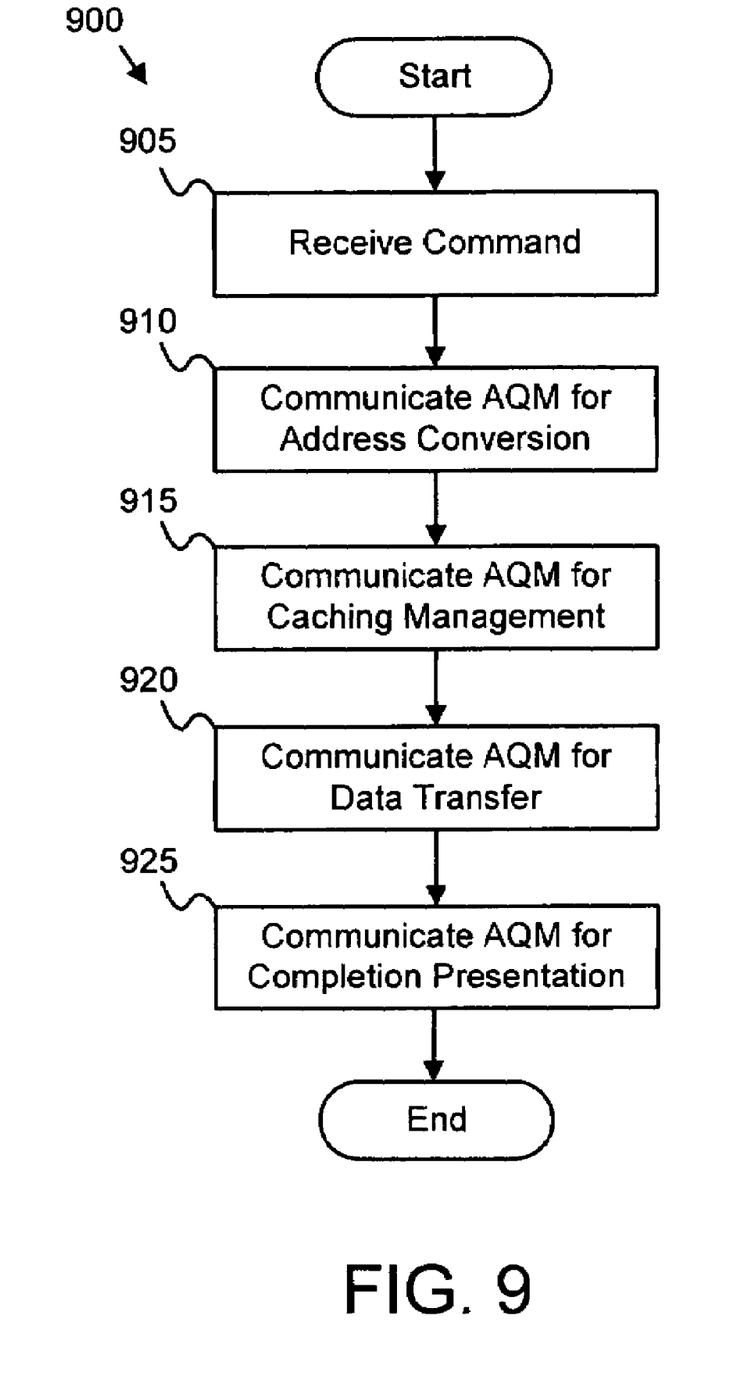
FIG. 9 is a flow chart diagram illustrating one embodiment of a method for distributed storage management in accordance with the present invention.

FIG. 9 is a flow chart diagram illustrating one embodiment of a method 900 for distributed management in accordance with the present invention. The method 900 provides for distributed storage management to control operations of a storage device 155 for data transfer from and to the host 105. Although for purposes of clarity, the steps of the method 900 and other methods, if any, are depicted in a certain sequential order, execution within an actual system may be conducted in parallel and not necessarily in the depicted order.

The receive command step 905 receives a command from the host interface 230 by the message management module 205. The communicate AQM for address conversion step 910 communicates an asynchronous queued message (AQM) 715 to the drive management module 250 configured to translate a logical address to a physical address and manage the storage device 155 in response to the AQM 715. The communicate AQM for caching management step 915 communicates the AQM 715 to the cache management module 225 configured to manage caching read and write data in response to the AQM 715. The communicate AQM for data transfer step 920 communicates the AQM 715 to the interface management module 210 configured to transfer data through the storage interface 235 to the storage device 155 in response to the AQM 715. The communicate AQM for completion presentation step 925 communicates the AQM 715 to the cache management module 225, the drive management module 250, and the message management module 205 to conclude the data transfer for completion presentation to the host interface 230.

In one embodiment, the method 900 further includes transferring data from the storage interface 235 to the host interface 230 in a read command. The method 900 may also include transferring data from the host interface 230 to the storage interface 235 in a write command. In an alternate embodiment, the method 900 further includes a write command with a pre-specified write back cache policy for which a completion is presented to the host interface 230 upon a conclusion of data transfer from the host interface 230 to the cache memory 145, wherefrom data may subsequently be transferred to the storage interface 235.

The present invention distributes storage management tasks to a plurality of distributed storage management modules to reduce processing and communication bottlenecks that are associated with a centralized microprocessor-based storage controller. Furthermore, the present invention provides for efficient inter-module communication through point-to-point passing of AQMs and the use of an associated common IOCTX memory. Thus, the present invention achieves a storage system performance optimization at a lower cost. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A distributed storage management apparatus, the apparatus comprising:
   a messaging module in communication with a host interface, the messaging module configured to receive and communicate an asynchronous queued message ("AQM") and communicate with the host interface responsive to a host command and the AQM;
   a drive module in communication with the messaging module, the drive module configured to receive and communicate the AQM, convert a logical address to a physical address, and manage a specified storage device task responsive to the AQM;
   a cache module in communication with the messaging module and the drive module, the cache module configured to receive and communicate the AQM and manage caching read and write data responsive to the AQM; and
   an interface module in communication with the cache module, the interface module configured to receive and communicate the AQM and transfer data through a storage interface to and from the storage device responsive to the AQM.

2. The apparatus of claim 1, further comprising an exception processor module in communication with the messaging module, the exception processor configured to receive and communicate the AQM and manage a specified task responsive to the AQM.

3. The apparatus of claim 1, further comprising a data module in communication with the messaging module, interface module, the drive module, and the cache module ("distributed storage management modules"), the data module configured to receive and communicate the AQM and execute storage management background operations responsive to the AQM.

4. The apparatus of claim 1, wherein the messaging module, drive module, cache module, and interface module are task-specific microsequencers.

5. The apparatus of claim 1, wherein the drive module may manage operations of a plurality of fault-tolerant storage devices referred to as redundant array of independent disks ("RAID").

6. The apparatus of claim 1, further comprising an input/output context ("IOCTX") memory module configured in blocks as space allocation units to hold a list of host-oriented command parameters ("H-IOCTX") and a list of storage device-oriented operation parameters ("D-IOCTX") for passing parameters between distributed storage management modules, and other pre-specified contexts, the IOCTX memory module further configured to manage IOCTX memory space allocation for the using distributed storage management modules.

7. The apparatus of claim 6, wherein the messaging module occupies a block of H-IOCTX memory during a command execution and frees the block subsequent to the command execution, and the caching module occupies a block of D-IOCTX memory during a data protection operation and frees the block subsequent to the data protection operation.

8. The apparatus of claim 1, further comprising an AQM queuing module configured to hold queues of a plurality of AQMs as linked lists for intercommunication between distributed storage management modules, the data structure of each AQM comprising an IOCTX memory pointer, an AQM type, and an AQM originator identity, the AQM queuing module further comprising logic for an AQM queue selection and insertion by a sender distributed storage management module and removal by a receiver distributed storage management module of each AQM in the selected queue.

9. The apparatus of claim 8, wherein the IOCTX memory pointer pointing to a non-existent IOCTX memory location indicates that the AQM is not associated with the IOCTX memory.

10. The apparatus of claim 8, wherein the distributed storage management module receiving AQMs in a pre-assigned AQM queue removes the AQMs in first in, first out ("FIFO") order.

11. The apparatus of claim 8, wherein the AQM queues may share the pool of a maximum number of AQM entries, and the number of available AQM entries may limit the depth of each AQM queue.

12. The apparatus of claim 8, wherein the distributed storage management module sending the AQM may further prioritize AQM queues pre-assigned to the receiver distributed storage management module wherefrom the receiver retrieves the AQM in order of priority.

13. A system for distributed storage management tasks, the system comprising:
   a storage device configured to store and retrieve data;
   a host;
   a cache memory; and
   a plurality of distributed storage management modules in communication with the storage device, the cache memory, and the host, the distributed storage management modules configured to receive and communicate a plurality of AQMs, convert logical addresses to physical addresses, manage the storage device, control data transfers to and from the storage device, manage caching read and write data, and create each AQM responsive to a host command.

14. The system of claim 13, further comprising an exception processor module in communication with the plurality of storage management modules, the exception processor configured to receive and communicate the AQM and manage a specified task responsive to the AQM.

15. The system of claim 13, further comprising an IOCTX memory module configured to hold host-oriented command parameters and storage device-oriented operation parameters stored and retrieved by the distributed storage management modules for inter-module parameter passing responsive to the AQM, the IOCTX memory module further configured to manage IOCTX memory space allocation.

16. The system of claim 13, further comprising an AQM queuing module configured to hold queues of a plurality of AQMs as linked lists for inter-module communication among the distributed storage management modules, the data structure of the AQM comprising an IOCTX memory pointer, an AQM type, and an AQM originator identity.

17. The system of claim 13, further comprising a data module configured to execute storage management background operations.

18. The system of claim 13, further comprising a non-volatile memory to store critical operation parameters that require protection against a power loss.

19. The system of claim 13, wherein the drive module may function as a RAID manager.

20. The system of claim 13, wherein the storage device may be selected from a Serial Attached SCSI ("SAS") disk drive, a Serial Advanced Technology Attachment ("SATA") disk drive, and a Fibre Channel disk drive.

21. The system of claim 14, wherein the distributed storage management modules and the exception processor may be integrated into a single chip with an inter-module communication capability.

22. A distributed storage management method, the method comprising:
   receiving a command from a host interface by a messaging module;
   communicating an AQM to a drive module configured to convert a logical address to a physical address and to manage a storage device responsive to the AQM;
   communicating the AQM to a cache module configured to manage caching read and write data responsive to the AQM;
   communicating the AQM to an interface module configured to transfer data through a storage interface to and from the storage device responsive to the AQM; and
   communicating the AQM to the cache module, the drive module, and the messaging module to conclude the data transfer for a presentation of completion to the host interface.

23. The method of claim 22, further comprising transferring data from the storage interface to the host interface in a read command.

24. The method of claim 22, further comprising transferring data from the host interface to the storage interface in a write command.

25. The method of claim 24, further comprising a write command with a pre-specified write back cache policy for which a completion is presented to the host interface upon conclusion of data transfer from the host interface to the cache memory, wherefrom data may subsequently be transferred to the storage interface.

26. An apparatus for distributed management in a storage system, the apparatus comprising:
   means for receiving a command from a host interface by a messaging module;
   means for communicating an AQM to a drive module configured to convert a logical address into a physical address and to manage a storage device responsive to the AQM;
   means for communicating the AQM to a cache module configured to manage caching read and write data responsive to the AQM;
   means for communicating the AQM to an interface module configured to transfer data through a storage interface to and from the storage device responsive to the AQM; and
   means for communicating the AQM to the cache module, the drive module, and the messaging module to conclude the data transfer for presentation of completion to the host interface.

* * * * *